(12) United States Patent
Zhang

(10) Patent No.: US 8,121,636 B2
(45) Date of Patent: Feb. 21, 2012

(54) PORTABLE COMMUNICATION DEVICE FOR RESPONDING TO INCOMING CALL

(75) Inventor: Li-Rong Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 336 days.

(21) Appl. No.: 12/485,272

(22) Filed: Jun. 16, 2009

(65) Prior Publication Data

US 2010/0167793 A1    Jul. 1, 2010

(30) Foreign Application Priority Data

Dec. 27, 2008  (CN) .......................... 2008 1 0306578

(51) Int. Cl.
 *H04M 1/00*  (2006.01)
 *H04B 1/38*  (2006.01)
(52) U.S. Cl. ..................... 455/550.1; 455/557; 455/568; 455/554.1
(58) Field of Classification Search .................. 455/567, 455/564, 568, 416, 550.1, 554.1
 See application file for complete search history.

(56) References Cited

U.S. PATENT DOCUMENTS

| | | | | |
|---|---|---|---|---|
| 4,890,315 A * | 12/1989 | Bendixen et al. | .......... | 455/554.2 |
| 5,257,397 A * | 10/1993 | Barzegar et al. | ........... | 455/553.1 |
| 5,263,078 A * | 11/1993 | Takahashi et al. | ............ | 455/557 |
| 5,408,520 A * | 4/1995 | Clark et al. | ................ | 379/93.07 |
| 5,787,365 A * | 7/1998 | Rivero et al. | ................ | 455/567 |
| 5,991,604 A * | 11/1999 | Yi | ................ | 455/74.1 |
| 6,195,571 B1 * | 2/2001 | Osuge | ........................ | 340/7.58 |
| 7,861,009 B2 * | 12/2010 | Skinner | ........................ | 710/10 |
| 7,894,847 B2 * | 2/2011 | Kuhn | ........................ | 455/550.1 |

* cited by examiner

*Primary Examiner* — Tilahun B Gesesse
(74) *Attorney, Agent, or Firm* — Altis Law Group, Inc.

(57) ABSTRACT

A portable communication device includes a receiving module, a pulse signal generating module, a timer module, and detection module. The receiving module is configured for receiving incoming signals sent to the portable communication device. The pulse signal generating module is configured for generating pulse signals when a portable communication device body is tapped. There is a first predetermined limit and a second predetermined limit, and the timer module is configured for starting timing when the pulse signal generating module generates the pulse signals, and stopping timing at the second predetermined limit. The detection module is configured for starting to detect if the pulse signal generating module generates pulse signals at the time between the first predetermined limit and the second predetermined limit. The detection module directs the receiving module to refuse or accept the incoming signals according to detecting results.

6 Claims, 2 Drawing Sheets

PORTABLE COMMUNICATION DEVICE FOR RESPONDING TO INCOMING CALL

BACKGROUND

1. Technical Field

The present disclosure relates to portable communication devices, and particularly to a portable communication device with a ring module.

2. Description of Related Art

Portable telephones often remain in a pocket or a bag when not in use. If a call is incoming, the telephone must be taken out to allow the user to accept or reject the incoming call. However, in some situations, it may be inappropriate to do so.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
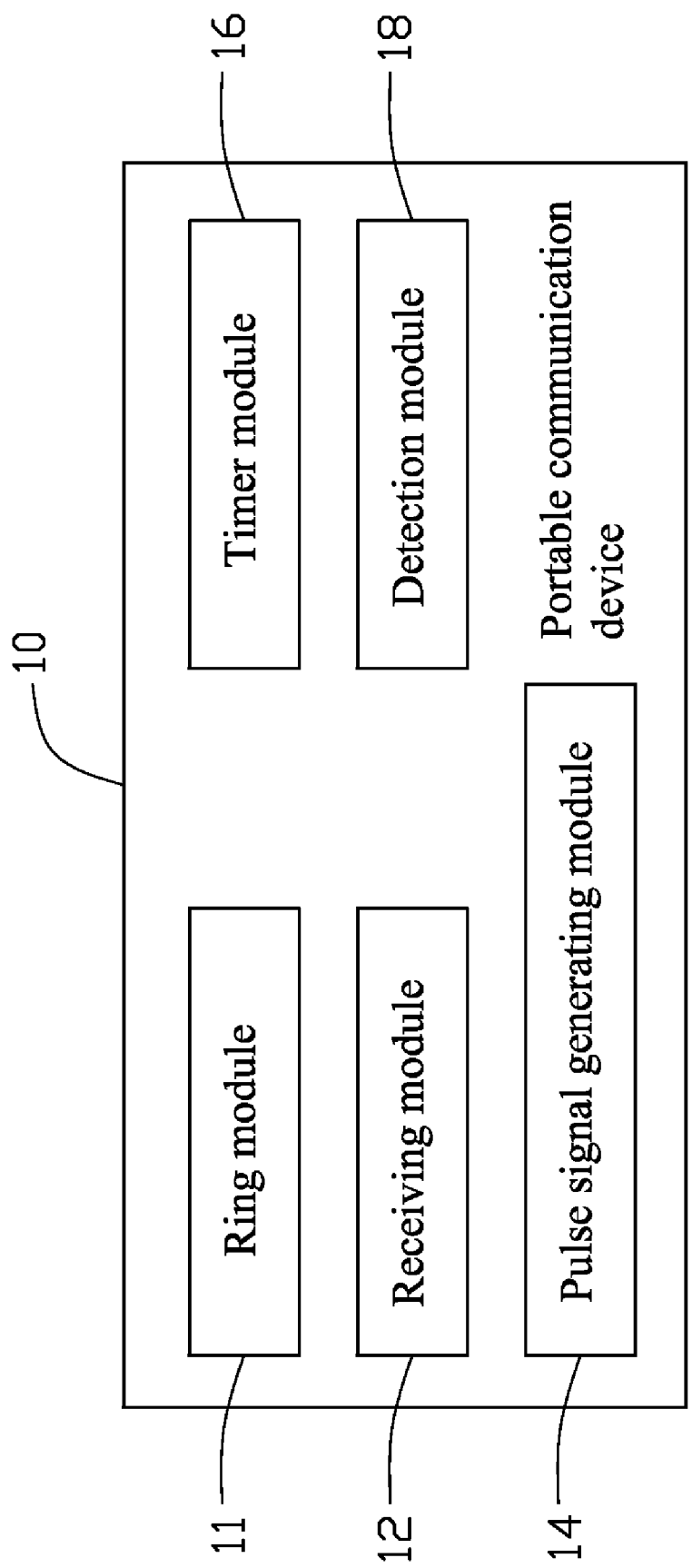
FIG. 1 is a block diagram of an embodiment of a portable communication device.

Referring to FIG. 1, an embodiment of a portable communication device 10, such as a portable telephone or a person digital assistant, includes a ring module 11, a receiving module 12, a pulse signal generating module 14, a timer module 16, and a detection module 18.

The receiving module 12 is configured to receive incoming signals to the portable communication device 10. The ring module 11 rings to indicate that the receiving module 12 is receiving a signal. The pulse signal generating module 14 generates pulse signals when the portable communication device 10 is tapped by the user. There is a first predetermined limit T1 and a second predetermined limit T2 occurring after the first predetermined limit T1. The timer module 16 begins timing when the pulse signal generating module 14 generates the pulse signals, ending at the second predetermined limit T2. The detection module 18 is capable of detecting if the pulse signal generating module 14 generates the pulse signals at the time between the first predetermined limit T1 and the second predetermined limit T2. The detection module 18 is capable of sending a refusal signal to the receiving module 12 if the pulse signals are detected by the detection module 18, and sending an acceptable signal to the receiving module 12 if no pulse signal is detected by the detection module 18. The receiving module 12 is capable of refusing or accepting the incoming signals when receiving the refusal or acceptance signal respectively, and simultaneously directing the ring module 11 to stop ringing.

Figure 2:
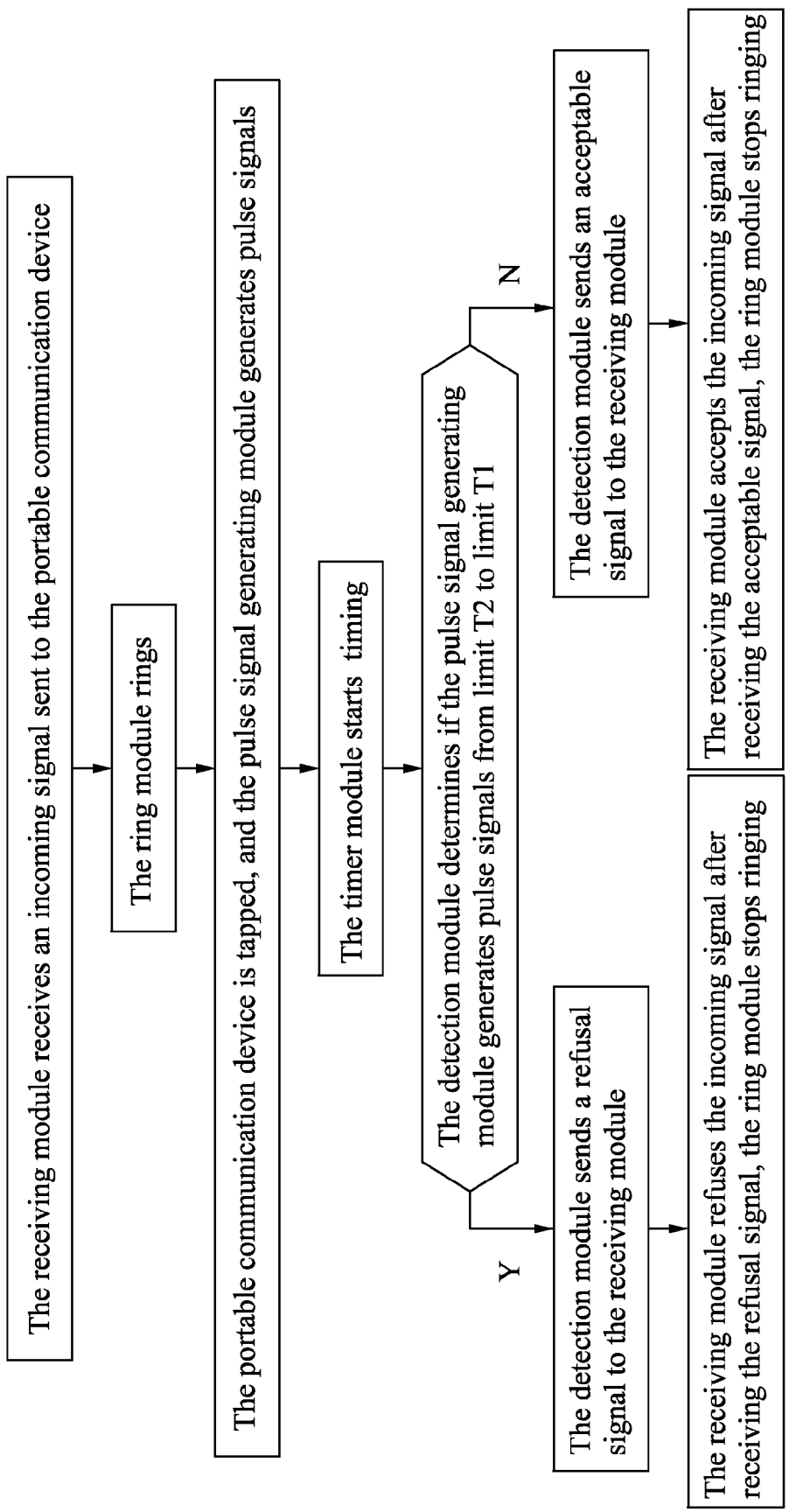
FIG. 2 is a flowchart illustrating an embodiment of an operating method of the portable communication device of FIG. 1.

Referring also to FIG. 2, during use, the receiving module 12 receives an incoming signal and directs the ring module 11 to ring. In response the user taps the portable communication device 10, the pulse signal generating module 14 generates pulse signals, and the timer module 16 starts timing. At the time between the first predetermined limit T1 and the second predetermined limit T2, the detection module 18 determines if the pulse generating module 14 generates the pulse signals. If so, the detection module 18 sends a refusal signal to the receiving module 12. The receiving module 12 refuses the incoming signal after receiving the refusal signal, and simultaneously directs the ring module 11 to stop ringing. If no pulse signal is detected by the detection module 18, the detection module 18 sends an acceptable signal to the receiving module 12. The receiving module 12 accepts the phone call after receiving the acceptable signal, and simultaneously directs the ring module 11 to stop ringing.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable communication device comprising:
   a receiving module capable of receiving an incoming call sent to the portable communication device;
   a pulse signal generating module configured for generating a first pulse signal when the portable communication device is tapped;
   a detection module configured for detecting the first pulse signal; and
   a timer module configured for starting timing when the first pulse signal is detected;
   wherein the pulse signal generating module is further configured for generating a second pulse signal when the portable communication device is tapped after the timer module reaches a first predetermined limit and before the timer module reaches a second predetermined limit greater than the first predetermined limit;
   and the detection module is further configured for detecting the second pulse signal, the receiving module is further configured for refusing the incoming call when the second pulse signal is detected, and accepting the incoming call when the second pulse signal is not detected and the timer module has reached the second predetermined limit.

2. The portable communication device of claim 1, further comprising a ring module configured to ring when the receiving module receives the incoming call.

3. The portable communication device of claim 2, wherein the receiving module is further configured to direct the ring module to stop ringing when the receiving module refuses or accepts the incoming call.

4. The portable communication device of claim 1, wherein the timer module is further configured to end timing when the timer module has reached the second predetermined limit.

5. The portable communication device of claim 1, wherein the detection module is further configured to send a refusal signal to the receiving module when the detection module detects the second pulse signal, and the receiving module is configured to refuse the incoming call when the receiving module receives the refusal signal.

6. The portable communication device of claim 1, wherein the detection module is further configured to send an acceptable signal to the receiving module when the detection module does not detect the second pulse signal and the timer module has reached the second predetermined limit, and the receiving module is configured to accept the incoming call when the receiving module receives the acceptable signal.

* * * * *